US005350152A

United States Patent [19]

Hutchison et al.

[11] Patent Number: 5,350,152

[45] Date of Patent: Sep. 27, 1994

[54] DISPLACEMENT CONTROLLED HYDRAULIC PROPORTIONAL VALVE

[75] Inventors: Eric A. Hutchison, Peoria; John J. Krone, Dunlap, both of Ill.

[73] Assignee: Caterpillar Inc., Peoria, Ill.

[21] Appl. No.: 172,981

[22] Filed: Dec. 27, 1993

[51] Int. Cl.[5] .......... F16K 31/42

[52] U.S. Cl. .......... 251/30.05; 91/387; 137/625.64; 251/47

[58] Field of Search .......... 137/625.64; 91/387; 251/30.05, 47

[56] References Cited

U.S. PATENT DOCUMENTS 4,201,116 5/1980 Martin .......... 91/387

5,144,983 9/1992 Schwelm .......... 137/625.64

*Primary Examiner*—Gerald A. Michalsky

*Attorney, Agent, or Firm*—John W. Grant

[57] ABSTRACT

A displacement controlled hydraulic proportional valve has a spring retainer and a force feedback spring serially disposed between a pilot valve spool and a main valve spool in a control chamber. An arcuate convex end portion on the pilot valve spool extends into a cylindrical pocket in the spring retainer essentially defining a contact point through which force is transferred between the pilot valve spool and the retainer. The point contact minimizes side loading on the pilot valve spool due to buckling of the feedback spring to minimize tendency of the pilot valve spool to stick during operation.

7 Claims, 1 Drawing Sheet

DISPLACEMENT CONTROLLED HYDRAULIC PROPORTIONAL VALVE

TECHNICAL FIELD

This invention relates to a servo hydraulic control valve for use in hydraulic systems and more particularly to a displacement controlled hydraulic proportional valve having a force feedback spring positioned between a main valve spool and a pilot valve spool.

BACKGROUND ART

Some of the displacement controlled hydraulic proportional valves have a main control valve for controlling the main fluid flow between a supply pump and a hydraulic actuator and a pilot valve for controlling actuation of the main control valve. The pilot valve is typically controlled by a proportional solenoid exerting a control force on a pilot valve spool to move the pilot valve spool relative to the main valve spool. Moving the pilot valve spool toward the main valve spool controls fluid pressure in a control chamber such that the main spool moves toward the pilot valve spool. Displacement of the main valve spool is mechanically fed back to the pilot valve spool through a force feedback spring positioned between the valve spools so that displacement of the main valve spool is proportional to the control force exerted on the pilot valve spool by the solenoid.

One of the problems encountered with such displacement controlled control valves is caused by friction on the pilot valve spool due to side loading thereon. The friction causes sticking of the pilot valve spool resulting in reduced accuracy of the positioning of the pilot valve spool which ultimately reduces the position accuracy of the actuator. In severe cases, the actuator may have a tendency to hunt for position. One factor that contributes to the side loading is that the force feedback spring is normally a coil compression spring which has a tendency to buckle under compression. Heretofore, one end of the feedback spring has been seated on a spring retainer fastened to the pilot valve spool. Buckling of the spring causes the spring retainer to impart a twisting moment onto the pilot valve spool resulting in side loading on the opposite ends of the spool. In severe cases, the metering lands on the spool tend to hang up on the edges of the annuluses of the valve body.

Another problem encountered with such displacement controlled control valves is that the main spool has a tendency to oscillate or become unstable under some operating conditions. One of the factors contributing to the instability is the fact that displacement of the main control valve spool is dependant upon the control force and feedback force on the pilot valve spool reaching equilibrium. Thus, if the acceleration forces on the main spool are too high, the main spool tends to overshoot the desired position such that the feedback forces acting on the pilot valve causes the pilot valve spool to oscillate which, in turn, causes the main valve spool to oscillate. The same pilot valve is frequently used with several sizes of main control valves and the instability is more pronounced on the control valves having smaller diameter main valve spools.

Thus, it would be advantageous to have a displacement controlled hydraulic proportional control valve designed to minimize side loading on the pilot valve spool to maximize the position accuracy of the pilot valve spool and, thus, the position accuracy of the actuator controlled by the control valve. It would also be advantageous to have a displacement controlled hydraulic proportional control valve which is stable regardless of the size of the main control valve spool and reduces the potential for hunting movements.

The present invention is directed to overcoming one or more of the disadvantages or problems as set forth above.

DISCLOSURE OF THE INVENTION

In one aspect of the present invention, a displacement controlled hydraulic proportional valve has a main valve spool, a control chamber disposed at one end of the main valve spool, a control port communicating with the actuating chamber, a pilot valve spool axially aligned with the main valve spool and movable in a first direction to control fluid flow out of the actuating chamber through the control port and in a second direction for controlling fluid flow into the actuating chamber through the control port, means for biasing the main valve spool toward the pilot valve spool, and a force module disposed to selectively exert an increasing control force against the pilot valve spool to move the pilot valve spool in the first direction and a decreasing control force against the pilot valve spool to move the pilot valve spool in the second direction. The control valve comprises a compression force feedback spring disposed within the actuating chamber between the pilot valve spool and the main valve spool. A spring retainer is disposed between the feedback spring and the pilot valve spool and has a cylindrical pocket facing the pilot valve spool. An arcuate convex end portion provided on the pilot valve spool extends into the cylindrical pocket.

BEST MODE FOR CARRYING OUT THE INVENTION

Figure 2:
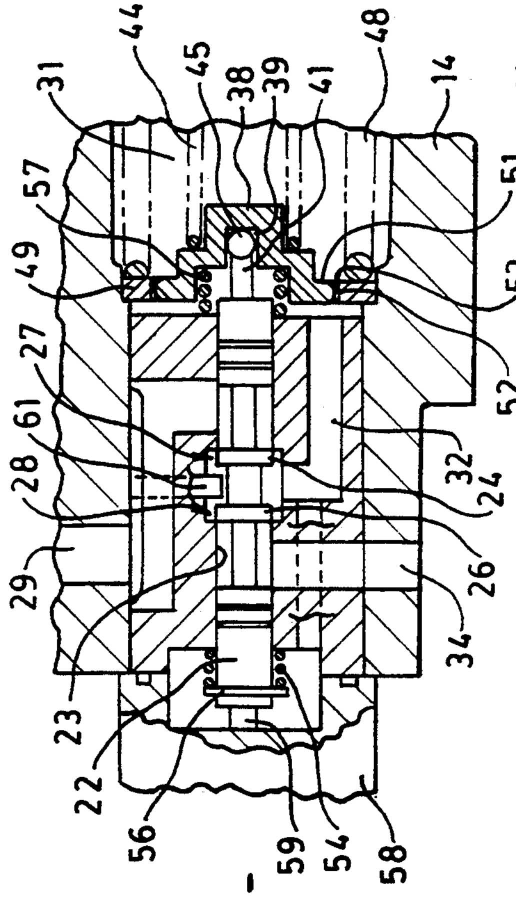
FIG. 2 is a somewhat enlarged sectional view of a portion of FIG. 1.
Figure 1:
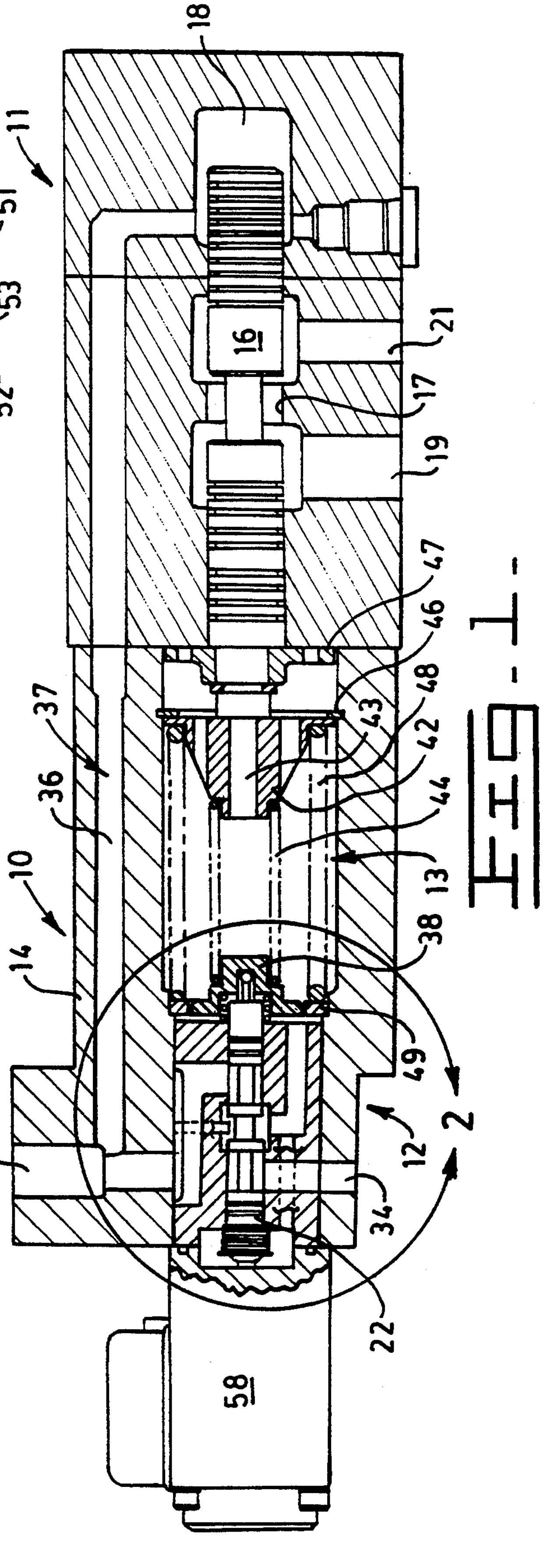
FIG. 1 is a diagrammatic sectional view through an embodiment of the present invention.

A displacement controlled hydraulic proportional control valve 10 includes a main control valve 11, a pilot valve 12 and a mechanical feedback mechanism 13 housed within a multi-piece valve body 14. The main control valve 11 includes a main valve spool 16 slidably disposed in a bore 17 and defining an actuating chamber 18. The main valve spool controls communication between a pair of ports 19,21 intersecting the bore 17. The pilot valve 12 hydraulically controls displacement of the main valve spool 16 and includes a pilot valve spool 22 slidably disposed within a bore 23 axially aligned with the bore 17. The valve spool 22 has a pair of axially spaced lands 24,26 which cooperate with the body to respectively define a variable meter-in orifice 27 and a variable meter-out orifice 28. The valve spool 22 is movable in a direction away from the valve spool 16 to control fluid flow through the meter-in orifice 27 from an inlet port 29 and into a control chamber 31 through a control port 32 and in a direction toward the valve spool 16 to control fluid flow through the meter-out orifice 29 out of the control chamber 31 through the control port 32 and an outlet port 34. A passage 36 communicates the inlet port 29 with the actuating chamber 18 and provides a means 37 for biasing the main valve spool toward the pilot valve spool.

The mechanical force feedback 13 includes a spring retainer 38 having a cylindrical pocket 39 facing the pilot valve spool and loosely receiving a stud 41 axially extending from the pilot valve spool, a spring retainer 42 seated on an extension 43 of the valve spool 16 and a coil compression force feedback spring 44 disposed between the spring retainers 38,42 to resiliently bias the valve spools away from each other. An arcuate convex end portion 45 is formed on the stud 41 and in this embodiment is in the form of a ball so that force transmitted between the spring retainer 38 and the valve spool passes essentially through a contact point therebetween. Rightward movement of the spring retainer 42 is limited by a snap ring 46. A washer 47 suitably secured to the valve spool 16 abuts the body 14 to limit rightward movement of the valve spool 16 and engages the snap ring 46 to limit leftward movement thereof. A main spool return spring 48 is disposed between a ring 49 seated in the body 14 and the spring retainer 42 to resiliently urge the valve spool 16 to the position shown.

The spring retainer 38 has an outwardly extending flange 51 which cooperates with a cylindrical bore 52 of the ring 49 to define an annular flow control dampening orifice 53 for restricting fluid communication between the control port 32 and the control chamber 31.

A stabilizing spring 54 is positioned between the body 14 and a retainer 56 suitably connected to the valve spool 22. Another stabilizing spring 57 is positioned between the body 14 and the retainer 38.

A force module in the form of a proportional solenoid 58 is suitably connected to the body 14 and has a stem 59 in abutment with the pilot valve spool 22. The solenoid 58 is energized when an electrical signal is directed thereto from a power source (not shown) with the control force exerted on the valve spool by the stem being proportional to the strength of the electrical signal.

A pin 61 extends into the bore 23 between the lands 24,26 to limit axial movement of the valve spool in both directions and, thus, the maximum size of the variable meter-in and meter-out orifices 27,28 respectively.

INDUSTRIAL APPLICABILITY

The main control valve 11 of this embodiment is of the type commonly referred to as an area control valve. More specifically, leftward movement of the valve spool 16 from the position shown progressively restricts and eventually blocks communication between the ports 19 and 21. Alternatively, the valve spool 16 could be configured to normally block communication between the ports 19 and 21 wherein leftward movement progressively establishes communication between the ports 19 and 21.

The components of the control valve 10 are shown in the position they would occupy when the inlet port 29 is connected to a source of pilot fluid, the outlet port 34 is connected to a tank, and a maintenance electrical signal is directed to the solenoid 58 for exerting a predetermined minimal force on the valve spool 22. Pressurized pilot fluid is transmitted through the passage 36 into the actuating chamber 18 for continuously biasing the valve spool 16 in a leftward direction toward the pilot valve spool 22. However, the pressurized fluid from the inlet port 29 also passes through the meter-in orifice 27 into the control chamber 31. The force exerted on the spool 16 by the pressurized fluid in the control chamber combined with the force of the spring 48 is sufficient to maintain the retainer 42 against the snap ring 46 such that the main valve spool 16 is in the position shown at which the port 19 communicates with the port 21.

To actuate the control valve 10, an electrical signal is directed to the solenoid 58 which, in turn, exerts a control force against the spool 22 proportional to the strength of the electrical signal. The control force moves the pilot valve spool rightwardly against the bias of the feedback spring 44 and the stabilizing spring 54 to initially block communication between the inlet port 29 and the control chamber 31 and subsequently communicates the control chamber 31 with the outlet port 34 to vent the control chamber. This reduces the pressure level in the control chamber 31 so that the force of the pressurized fluid in the actuating chamber 18 moves the valve spool 16 leftwardly in a valve closing direction to modulatably control communication between the ports 19 and 21. The leftward movement of the valve spool 16 compresses the feedback spring 44 which exerts a feedback force against the pilot valve spool 22 to counteract the control force exerted on the valve spool by the solenoid 58. The leftward movement of the valve spool 16 will continue until the feedback force and the control force acting on the pilot valve spool are in equilibrium. At that point, communication between the inlet port 29 and the control chamber 31 and between the control chamber 31 and the outlet port 34 is controllably modulated such that displacement of the valve spool 16 is proportional to the level of the control force exerted on the pilot valve spool 22 by the solenoid 58.

The convex end portion 45 provides essentially a point contact between the valve spool 22 and the spring retainer 38 such that essentially no side loads are imposed on the pilot valve spool which might otherwise be imposed on the pilot valve spool due to buckling of the feedback spring during compression thereof.

During the above operation, fluid passing into the control chamber 31 from the control port 27 or passing out of the control chamber 31 into the control port 27 passes through the annular orifice 53. This tends to dampen relative movement between the valve spools and controls the high frequency oscillations of the actuator. Moreover, forcing the fluid to pass through the orifice controllably reduces the acceleration forces of the valve spool and minimizes the tendency of the valve spool 16 to overshoot the position dictated by the electrical control signal.

Additional stability is provided by the stabilizing springs 54 and 57. More specifically, the preload force of the spring 54 acts between the body 14 and the pilot spool 22 while the preload force of the spring 57 acts between the body and the spring retainer 38. With this arrangement of stabilizing springs, both stabilizing springs add stability stiffness to the control valve during normal operation. During shutdown, the stabilizing spring 54 will shift the pilot valve spool 22 to communicate the inlet port 29 with the control chamber 31 to move the valve spool 16 to the position shown since the preload force on the stabilizing spring 57 does not resist the preload force of the stabilizing spring 54 and the end portion 45 moves out of force transmitting engagement with the spring retainer 38.

In view of the above, it is readily apparent that the structure of the present invention provides an improved displacement controlled hydraulic proportional valve which essentially eliminates the transfer of side loads into the pilot valve spool. Eliminating side loading on the pilot valve spool greatly enhances the positional accuracy of the pilot valve spool, the main valve spool and ultimately the actuator controlled by the control valve. Moreover, high frequency oscillations of the actuator controlled by the control valve are minimized by providing the annular orifice to dampen relative movement between the pilot valve spool and the main valve spool. Finally, additional stability is provided by the pair of stabilizing springs which provide pilot valve stiffness during normal operation.

Other aspects, objects and advantages of this invention can be obtained from a study of the drawings, the disclosure and the appended claims.

We claim:

1. A displacement controlled hydraulic proportional valve having a main valve spool, a control chamber disposed at one end of the main valve spool, a control port communicating with the control chamber, a pilot valve spool in axial alignment with the main valve spool and movable in a first direction to control fluid flow out of the control chamber through the control port and in a second direction to control fluid flow into the control chamber through the control port, means for biasing the main valve spool toward the pilot valve spool, and a force module disposed to selectively exert an increasing control force against the pilot valve spool to move the pilot valve spool in the first direction and a decreasing control force against the pilot valve spool to move the pilot valve spool in the second direction comprising;

a compression force feedback spring disposed within the control chamber between the pilot valve spool and the main valve spool;

a spring retainer disposed between the feedback spring and the pilot valve spool and having a cylindrical pocket facing the pilot valve spool; and an arcuate convex end portion provided on the pilot valve spool and extending into the cylindrical pocket.

2. The proportional valve of claim 1 including means defining a cylindrical bore, the spring retainer having an annular flange cooperating with the cylindrical bore to define an annular flow control dampening orifice communicating the control port with the control chamber.

3. The proportional valve of claim 2 including a stabilizing spring disposed between the body and the pilot valve spool biasing the pilot valve spool in the second direction.

4. The proportional valve of claim 3 including another stabilizing spring disposed between the body and the spring retainer.

5. The proportional valve of claim 1 including a stabilizing spring disposed between the body and the pilot valve spool biasing the pilot valve spool in the second direction.

6. The proportional valve of claim 5 including another stabilizing spring disposed between the body and the spring retainer.

7. The proportional valve of claim 1 wherein the arcuate convex end portion is a spherical end portion.

* * * * *